United States Patent [19]

Varela et al.

[11] Patent Number: 5,230,078
[45] Date of Patent: Jul. 20, 1993

[54] METHOD FOR A CONSOLE TO QUICKLY MONITOR A GROUP

[75] Inventors: Ruth A. Varela, Palatine; Kenneth G. Sommer, Streamwood; Arthur L. Fumarolo, Elk Grove Village, all of Ill.

[73] Assignee: Motorola Inc., Schaumburg, Ill.

[21] Appl. No.: 740,358

[22] Filed: Aug. 5, 1991

[51] Int. Cl.$^5$ ............................................. H04B 17/00
[52] U.S. Cl. ..................................... 455/67.1; 370/79; 455/9; 455/67.7; 340/825.06; 340/825.17; 340/825.15; 379/34
[58] Field of Search ................................... 370/79, 85.1; 340/825.06, 825.1, 825.15, 825.17; 379/34; 455/67.1, 67.7, 9

[56] References Cited

U.S. PATENT DOCUMENTS

| | | | |
|---|---|---|---|
| 4,698,805 | 11/1987 | Sasuta et al. | 370/97 |
| 4,887,260 | 12/1989 | Carden et al. | 340/825.17 X |
| 4,926,495 | 5/1990 | Comroe et al. | 370/85.1 X |
| 4,995,095 | 2/1991 | Lohrbach et al. | 340/825.06 X |

Primary Examiner—Douglas W. Olms
Assistant Examiner—Russell W. Blum
Attorney, Agent, or Firm—Timothy W. Markison; Steven G. Parmelee

[57] ABSTRACT

In a communication system that comprises a plurality of communication groups, a plurality of transceivers, and a plurality of consoles which monitor selected communication groups, a console may quickly monitor an unmonitored communication in the following manner. When the console detects activity in a particular unmonitored communication group, that communication group is placed into a receive queue. Once the communication group is in the receive queue, a dispatcher of the console may select the communication group and place it into a monitoring queue. Once in the monitoring queue, the dispatcher has full monitoring capabilities over that communication group. Once the dispatcher is done with the communication group, or call activity ends in the communication group, the communication group is placed back into a system group list.

15 Claims, 2 Drawing Sheets

METHOD FOR A CONSOLE TO QUICKLY MONITOR A GROUP

Field of the Invention

This invention relates generally to communication systems and in particular to a method that enables a console of the communication system to quickly and easily monitor unmonitored communication groups.

BACKGROUND OF THE INVENTION

Trunked communication systems and conventional communication systems are known to comprise a plurality of communication units that are arranged into communication groups, a plurality of repeaters that transceive a limited number of communication resources, a central controller, and a plurality of consoles. For trunked communication systems, the plurality of communication units are arranged into talk groups, or fleets, while in conventional communication systems, the plurality of communication units are arranged into groups based on particular channel usage. The consoles are operated by a dispatcher such that the dispatcher can monitor the activity of particular communication groups and respond thereto. For example, the dispatcher may dispatch particular units to assist another unit, or respond to emergency conditions or transmit a general message to all communication units in the group.

A typical CRT console comprises a screen that utilizes menu driven software to assist the dispatcher in monitoring communication groups. A typical console has certain groups that are permanently assigned to it and communication groups that the dispatcher may assign to it. The communication groups that are permanently assigned to the console may be changed by a system manager but generally are not changeable by the dispatcher. For the assignable locations, the dispatcher selects which communication groups desires to monitor from a system group list and assigns them to an assignable position. The assignment of a group to an assignable location, the dispatcher must select a monitor menu driven function and perform several operations. For additional information on the monitor menu driven function refer to Motorola, Inc. publication R4-2-73, entitled: System Planner-CENTRACOM Series II Plus Control Centers.

The above method works well when the dispatcher infrequently changes the communication groups he or she is monitoring. However, when a dispatcher frequently changes the communication groups he or she monitors, this procedure may become cumbersome and time consuming. Therefore, a need exists for a method which allows a dispatcher to quickly monitor unmonitored communication groups.

SUMMARY OF THE INVENTION

These needs and others are substantially met by the method for a console to quickly monitor a group as disclosed herein. In a communication system that includes a plurality of communication units arranged into communication groups, a plurality of repeaters that transceive a limited number of communication resources, a central controller, and a plurality of consoles, the consoles monitor the call activity of selected communication groups. A method for a console to quickly obtain full monitoring capabilities over an unmonitored communication groups can be obtained by detecting activity on an unmonitored communication group. Once activity is detected on an unmonitored communication group, that communication group is placed into a receive queue when the receive queue is activated. An operator of a console may elect to monitor a communication group in the receive queue by transferring it to a monitoring queue. When the call activity is done within the particular communication group or when the particular communication group gets bumped from the queue it is removed from the monitoring queue.

DESCRIPTION OF A PREFERRED EMBODIMENT

As mentioned in the background section, a trunked communication system or a conventional communication system comprises a plurality of communication units that are arranged into communication groups, a plurality of repeaters that transceive a limited number of communication resources, a central controller, and a plurality of consoles which monitors call activity of selected communication groups. The consoles comprise several software packages to assist a dispatcher in performing his or her duties in monitoring the activity of its selected communication groups as is known in the art. Nevertheless, to perform the functions of the present invention, a console may require additional memory locations and processing circuitry or may use existing memory and processing circuitry.

Generally, the present invention allows a dispatcher to quickly obtain full monitoring capabilities over unmonitored communication groups. This is achieved by providing a receive queue which stores communication groups that are presently having activity within it or have initiated a request for a communication resource. The communication group that has the most recent activity is placed at the top of the receive queue. The dispatcher may select a communication group from the receive queue by clicking on the particular communication group which places it in a location of a quick monitor queue. (The clicking process is only applicable if the console is equipped with a mouse or other type of on screen selection process.) Once the communication group has been placed into a location in the quick monitor queue, the dispatcher has full monitoring capabilities over that communication group. With the addition of the quick monitor queue and the receive queue, the dispatcher no longer has to select a menu driven program to monitor a communication group and go through several functions to obtain the full monitoring capabilities as was required in prior art consoles.

Figure 1:
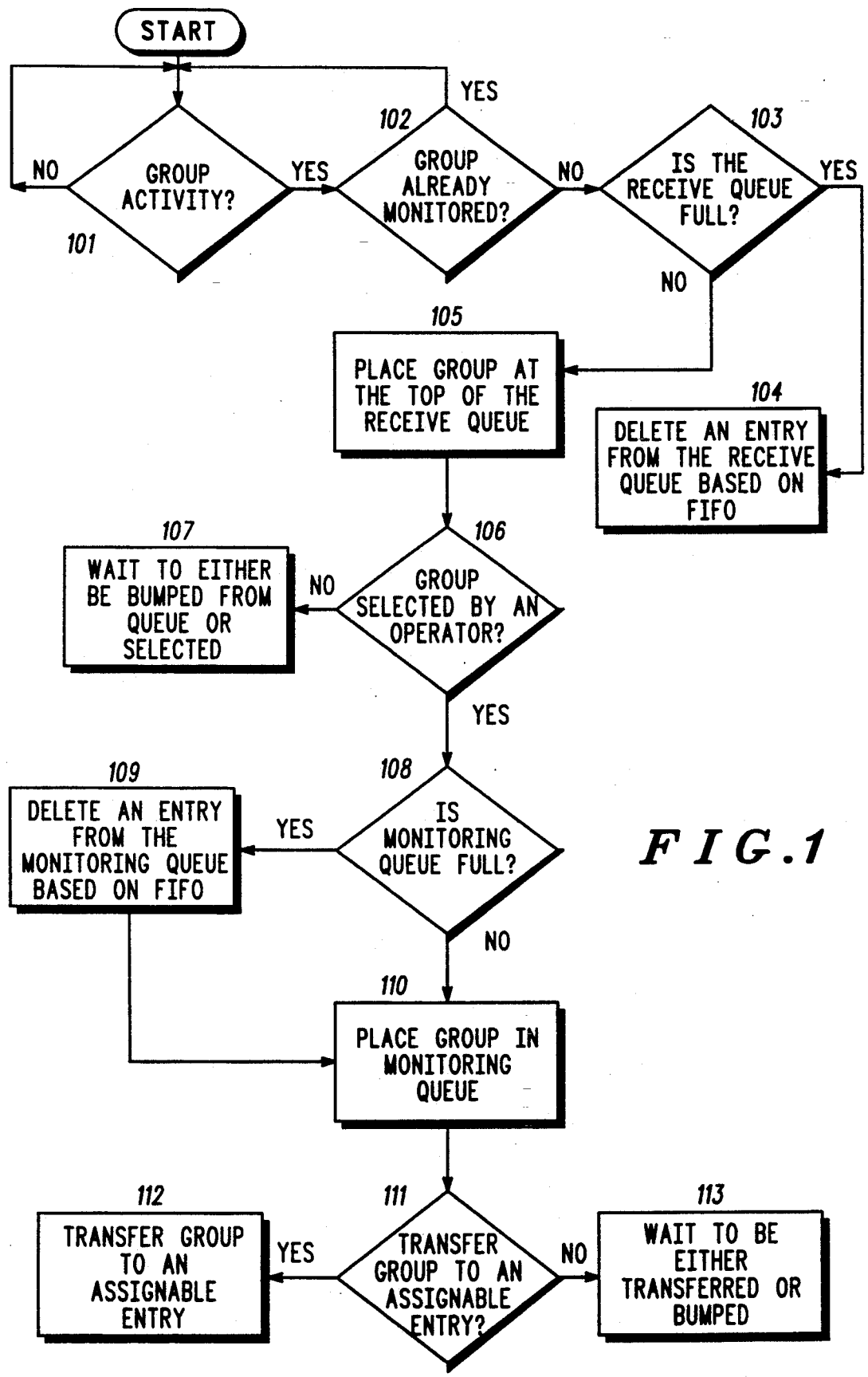
FIG. 1 illustrates a logic diagram that a console may incorporate to perform the present invention.

FIG. 1 illustrates a logic diagram which implements the present invention. The process begins at step 101 which looks for group activity in an unmonitored communication group. If no call activity occurs, the process waits until activity does occur. Communication group activity may be a request for a voice channel, an emergency condition being activated, data or voice is presently being transmitted, or any other communication unit conveyance that a dispatcher should monitor.

Once activity is sensed in a communication group 101, the process determines whether that communication group is already being monitored in either a fixed assignment location or an assignable assignment location 102. If the communication group is presently being monitored 102, the process returns to step 101. If the communication group is not presently being monitored 102, the process determines whether the receive queue is full 103. If the receive queue is full 103, a communication group is deleted from it in a first-in-first-out manner 104. Regardless of whether the receive queue is full, the unmonitored communication group is placed at the top of the receive queue 105. Note that it is not essential that the communication group be placed on the top of the queue, however, this provides the dispatcher with information on the relative length that each communication group has been in the receive queue. Note also that if a communication group is in the receive queue and additional activity occurs within it, the communication group will not move to the top of the queue, but will remain where it is in the queue. In addition, each group in the receive queue may be highlighted to indicate what type of activity the group is experiencing. For example, if the console comprises a color CRT, the groups name may appear in different colors to indicate the activity such as red for an emergency, blue for requesting a voice channel, yellow for already conveying data or voice.

Once the group is placed in the receive queue, the dispatcher has the opportunity to select it 106. If the group remains unselected by the dispatcher 106, it waits to either be selected or bumped from the receive queue 107. Once the group is selected by the dispatcher 106, the process continues by checking the monitoring queue to determine if it is full 108. If the monitoring queue is full, a communication group is deleted from the monitoring queue on a first in first out basis 109. Regardless of whether the monitoring queue is full or not, the newly selected communication group is placed into the monitoring queue 110. Once the communication group is placed in the monitoring queue 110, the process determines whether the group is to be transferred to an assignable monitoring location 111. If the communication group is to be transferred 111, the group is transferred as in prior art systems 112. If, however, the communication group is not transferred 111, it waits to either be transferred or bumped from the monitoring queue 113.

Once the communication group is in the monitoring queue, the dispatcher has full monitoring operation over it such as responding to emergencies, priority communication and other existing functions. If the dispatcher desires to maintain full monitoring operation over a group in the monitoring queue, he or she may do so by using the menu drive software monitor function as is known in the art.

In some incidences, communication groups are being added and deleted from the receive queue so rapidly that it may be difficult for the dispatcher to click onto a particular communication group. Therefore, the above routine may also include a process which freezes the receive queue from adding or deleting any communication groups to or from it until the dispatcher has an opportunity to select a communication group from it. This may be achieved when the dispatcher clicks on the receive queue heading or some where in the receive queue, the receive queue ceases to accept or delete communication groups to or from it until a communication group is selected from it and placed into the monitoring queue. Once a group is placed into the monitoring queue, the receive queue is unfrozen such that it may receive and delete communication groups to and from it.

Figure 2:
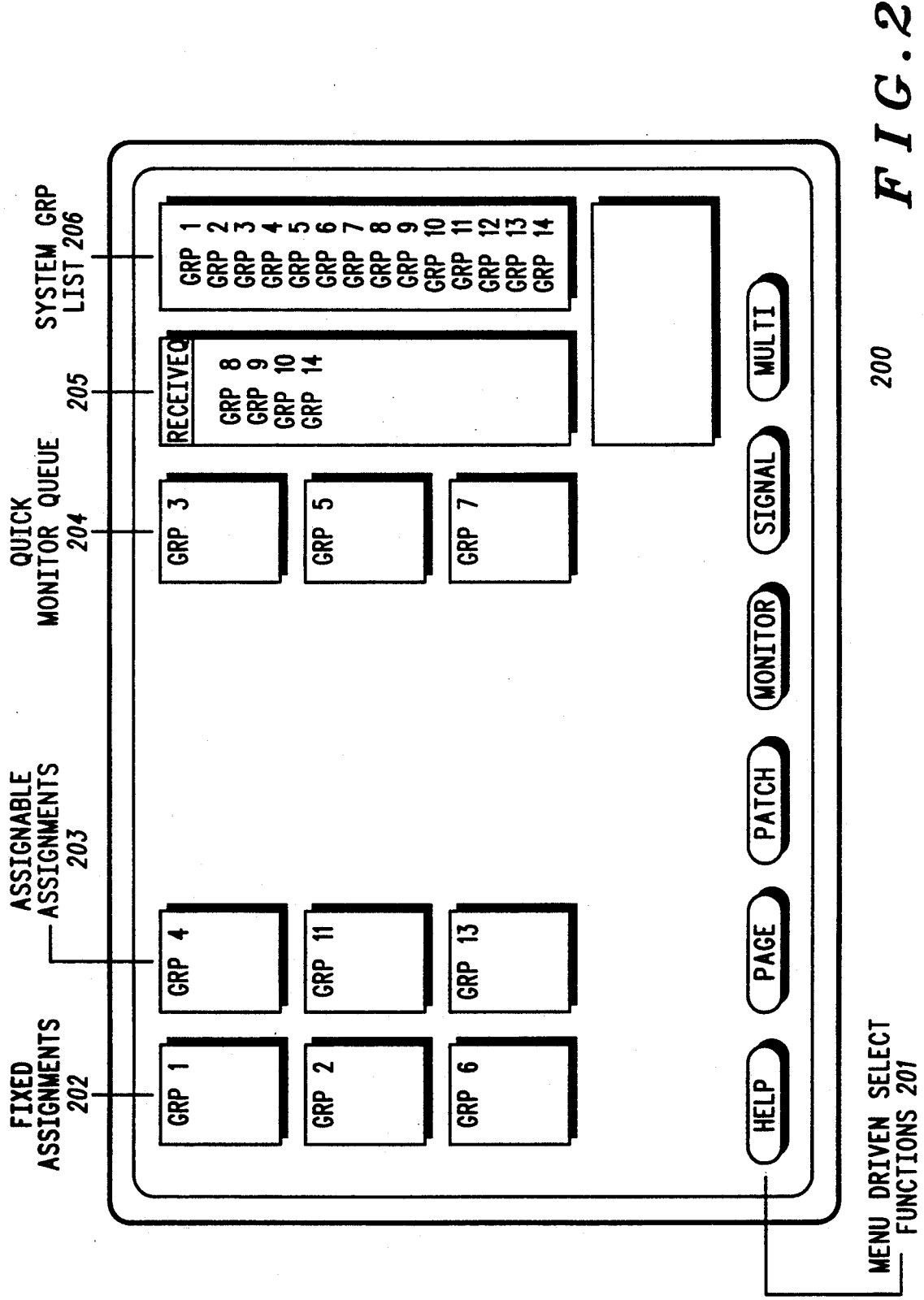
FIG. 2 illustrates a CRT screen of a console that incorporates the present invention.

FIG. 2 illustrates a CRT screen of a console which incorporates the present invention 200. This screen illustrates menu driven selection functions 201, fixed assignment locations 202, assignable assignment locations 203, a quick monitor queue 204, a receive queue 205, and a system group list 206. The system group list 206 comprises a list of communication groups that are affiliated with this particular communication system. The quick monitor queue is illustrated as having three locations, however, any numbered of locations may be used. As mentioned above, with this type CRT screen, the use of a mouse to click and drag groups from one location to the other is quite beneficial. For example, if the dispatcher desires to quickly monitor group 8 which at the top of the receive queue, the dispatcher places the cursor on group 8 clicks his or her mouse and drags it into the first location of the quick monitoring queue 204. By doing this, the communication group that was the first entry into to the quick monitoring queue is then transferred back to the receive queue such that the first in first out queueing method is employed. Once activity ceases in the receive queue, the communication group is placed back into the system group list.

The above describes an invention which is particularly well suited for use with a CRT console screen, however, the above invention may also be applicable for consoles that do not have a CRT screen or for consoles that do not utilize a mouse but employ other on screen selection mechanisms.

We claim:

1. In a communication system that includes a plurality of communication units, a plurality of repeaters that transceive a limited number of communication resources, a central controller, and a plurality of consoles, a method for an operator of one of the plurality of consoles to quickly obtain full monitoring capabilities over an unmonitored communication resource, the method comprising the steps of:
   a) detecting activity by an unmonitored communication resource to produce an active unmonitored communication resource;
   b) placing the active unmonitored communication resource in a receive queue when the receive queue is active and when activity is detected on the active unmonitored communication resource;
   c) transferring the active unmonitored communication resource to a monitoring queue when the unmonitored communication resource has been selected; and
   d) removing the active unmonitored communication resource from the monitoring queue when the unmonitored communication resource is no longer active or when deleted from the monitoring queue.

2. In the method of claim 1 step (c) further comprises deleting an unmonitored communication resource from the monitored queue in a first in first out manner when the monitored queue is full.

3. In the method of claim 1 step (b) further comprises placing the active unmonitored communication resource at the top of the receive queue.

4. In the method of claim 1 step (b) further comprises highlighting on the console the active unmonitored communication resource when it is placed in the monitored queue.

5. The method of claim 1 further comprises temporarily prohibiting the placing the active unmonitored communication resource in the receive queue when the receive queue is deactivated.

6. In a communication system that includes a plurality of communication units arranged into communication groups, a plurality of repeaters that transceive a limited number of communication resource, and a plurality of CRT consoles that each contain menu driven software programs, a method for a CRT console to quickly obtain full monitoring capabilities over an unmonitored communication group, the method comprises the steps of:
   a) detecting activity by an unmonitored communication group to produce an active unmonitored communication group;
   b) placing the active unmonitored communication group in a receive queue when the receive queue is active and when activity is detected within the active unmonitored communication group;
   c) transferring the active unmonitored communication group to a monitor queue when the active unmonitored communication group is selected by an on screen single user operation process; and
   d) Removing the active unmonitored communication group from the monitoring queue when it is no longer active, when it is deleted from the monitoring queue, or when it is transferred to an assignable monitoring position.

7. In the method of claim 6 step (c) further comprises deleting an unmonitored communication resource from the monitored queue in a first in first out manner when the monitored queue is full.

8. In the method of claim 6 step (b) further comprises placing the active unmonitored communication resource at the top of the receive queue.

9. In the method of claim 6 step (b) further comprises highlighting on the CRT console the active unmonitored communication resource when it is placed in the monitored queue.

10. The method of claim 6 further comprises temporarily prohibiting the placing the active unmonitored communication resource in the receive queue when the receive queue is deactivated.

11. In a console that monitors a predetermined number of communication groups where some of the predetermined number of communication groups are fixed assignments and where some of the predetermined number of communication groups are assignable assignments, a method for the console to quickly monitor communication groups that the console is not presently monitoring, the method comprises the steps of:
   a) detecting active on an unmonitored communication group to produce an active unmonitored communication group;
   b) placing the active unmonitored communication group in a receive queue when the receive queue is active and when activity is detected within the active unmonitored communication group;
   c) transferring the active unmonitored communication group to a monitor queue when the active unmonitored communication group is selected; and
   d) removing the active unmonitored communication group from the monitoring queue when it is no longer active, when it is deleted from the monitoring queue, or when it is transferred to an assignable monitoring position.

12. In the method of claim 11 step (c) further comprises deleting an unmonitored communication resource from the monitored queue in a first in first out manner when the monitored queue is full.

13. In the method of claim 11 step (b) further comprises placing the active unmonitored communication resource at the top of the receive queue.

14. In the method of claim 11 step (b) further comprises highlighting on the console the active unmonitored communication resource when it is placed in the monitored queue.

15. The method of claim 11 further comprises temporarily prohibiting the placing the active unmonitored communication resource in the receive queue when the receive queue is deactivated.

* * * * *